(12) United States Patent
Keeble et al.

(10) Patent No.: US 6,811,413 B2
(45) Date of Patent: Nov. 2, 2004

(54) ELECTRO-OPTICAL MODULE ASSEMBLY

(75) Inventors: Daniel Keeble, Felixstowe (GB); Christopher John Ord, Ipswich (GB); Goncalo Agra Amorim, Ipswich (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/375,479

(22) Filed: Feb. 27, 2003

(65) Prior Publication Data

US 2003/0171013 A1 Sep. 11, 2003

(30) Foreign Application Priority Data

Mar. 5, 2002 (EP) .............................................. 02251524

(51) Int. Cl.⁷ .......................... H01R 12/00; H05K 1/00
(52) U.S. Cl. .................... 439/79; 439/374; 439/545; 439/532; 439/567; 439/83; 439/76.1
(58) Field of Search ........................... 439/79, 83, 374, 439/545, 532, 567, 76.1

(56) References Cited

U.S. PATENT DOCUMENTS

| | | | |
|---|---|---|---|
| 4,908,335 A | * | 3/1990 | Cosmos et al. ............... 439/79 |
| 5,767,999 A | | 6/1998 | Kayner ........................ 359/163 |
| 6,179,627 B1 | | 1/2001 | Daly et al. .................. 439/76.1 |
| 6,241,534 B1 | * | 6/2001 | Neer et al. .................. 439/76.1 |
| 6,499,890 B2 | * | 12/2002 | Gilliland et al. .............. 385/88 |
| 6,511,345 B1 | * | 1/2003 | Hwang ..................... 439/541.5 |
| 6,575,770 B2 | * | 6/2003 | Birch et al. ................. 439/76.1 |
| 6,577,506 B1 | * | 6/2003 | Wakita et al. ............... 361/737 |
| 2001/0043778 A1 | | 11/2001 | Griffis et al. .................. 385/76 |
| 2002/0009905 A1 | | 1/2002 | Poplawski et al. ......... 439/76.1 |

FOREIGN PATENT DOCUMENTS

| | | |
|---|---|---|
| WO | WO 00/77551 | 7/2000 |
| WO | WO 00/13054 | 9/2000 |

* cited by examiner

*Primary Examiner*—Truc Nguyen (57) ABSTRACT

The present invention concerns an electro-optical module assembly, which is capable of being plugged into and removed from a DWDM system. The assembly comprises an electro-optical module with horizontal grooves and vertical slots which when inserted into protrusions disposed on the module mounting device, allow for a "drop and slot" type insertion of the module. The present invention also integrates EMI shielding within the electro-optical module assembly.

20 Claims, 11 Drawing Sheets

ELECTRO-OPTICAL MODULE ASSEMBLY

FIELD OF THE INVENTION

The present invention concerns an improved electro-optical module assembly for use in a telecommunications or networking system. Specifically, the present invention concerns an improved fibre optic module which is capable of being plugged into and removed from a telecommunications\networking system.

DISCUSSION OF THE BACKGROUND ART

As the capacity in telecommunication\networking systems grow, there is an increasing need to provide optical modules which can be inserted and removed from the telecommunications\networking system without having to power down the system. This is known in the field as "hot plugability".

Furthermore, there is a trend in telecommunications\networking systems towards greater integration. This means that customers wish to place more components and/or modules into their system using as little space as possible. Thus there is a need to provide components and modules, which can be mounted to the customer's board using a minimum of board space, thus allowing for maximum module density on the customer's board. Using less board space also saves on cost.

Figure 1:
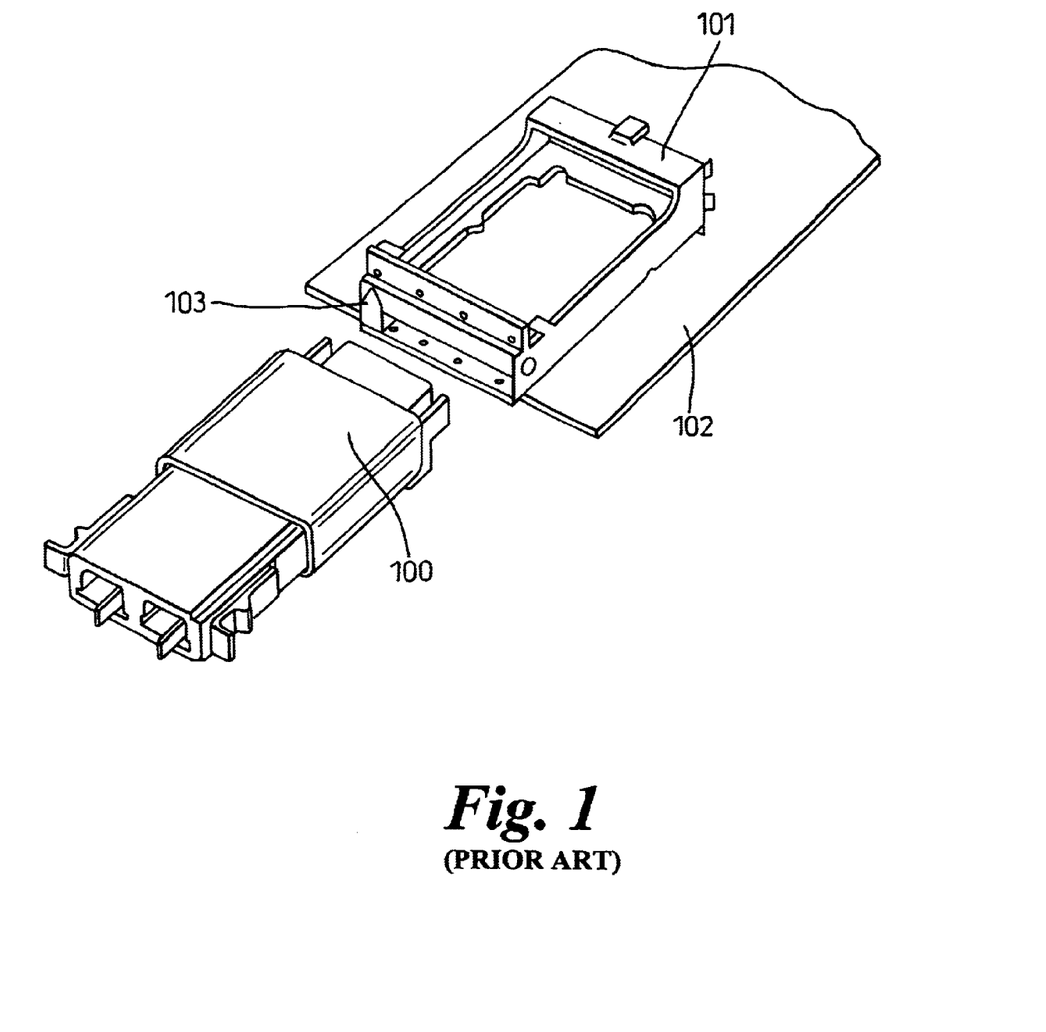
FIG. 1 shows a prior art mounting arrangement for an optical module.

Typically, optical modules are either fixed onto a customer's printed circuit board (PCB) directly or, as shown in FIG. 1, slotted through a front panel of a chassis mounted on the board. In FIG. 1, the known mounting arrangement is shown in which a transceiver module 100 is connected to a customer's PCB 102 via chassis 101. The module is inserted through a front panel 103 of the chassis, which is mounted to the customer's PCB.

Directly fixing the optical module to the board requires an excessive amount of PCB space, whereas the chassis arrangement shown in FIG. 1 only allows the module to be inserted from the front of the board.

Furthermore, the mounting methods described above do not inherently provide adequate electromagnetic interference (EMI) shielding. EMI shielding must be achieved with additional, separate shielding means, which occupies yet more PCB space.

SUMMARY OF THE INVENTION

Thus, it is an object of the present invention to provide a module and module mounting means, which is hot pluggable and which uses a minimum of customer PCB space.

It is a further object of the present invention to integrate EMI shielding within the module and module mounting means.

According to the present invention there is provided an electro-optic module assembly comprising an electro-optic module and a module mounting means, the module having a groove and a slot and said module mounting means having disposed thereon a protrusion to receive said groove and said slot.

Preferably the groove is disposed horizontally along the module and the slot is disposed perpendicular to the groove. More preferably the module comprises two grooves disposed on opposite sides of the module and a plurality of slots also disposed on opposite sides of the module.

According to a further aspect of the present invention, the module mounting means comprises a plurality of protrusions disposed on opposite sides of the mounting means.

According to yet a further aspect of the present invention, the module mounting means further comprises at least one post extending from the mounting means to facilitate connection of the mounting means to a printed circuit board.

According to yet a further aspect of the present invention, the module mounting means comprises EMI shielding means. The EMI shielding means may include at least one resilient finger arranged to exert pressure on the module so as to improve electrical connection between the module and the EMI shielding means.

Preferably, the electro-optical module is a transceiver. Alternatively, the electro-optic module may be a receiver or a transmitter.

The electro-optic module assembly may be used in an optical telecommunications system or an optical networking system.

Advantageously, the present invention provides an electro-optic assembly, which is both hot pluggable and uses a minimum of space on the customer's PCB.

Furthermore, the present invention provides improved EMI shielding by incorporating shielding means within the assembly, again saving space on the customer's PCB.

By reducing the space required on the PCB, the customer can fit more modules into his system, thus increasing the overall capacity of his communication network.

BRIEF DESCRIPTION OF THE DRAWINGS

While the principle advantages and features of the invention have been described above, a greater understanding and appreciation of the invention may be obtained by referring to the drawings and detailed description of the preferred embodiments, presented by way of example only, in which;

FIG. 2b shows a side view of the module shown in FIG. 2a,

DETAILED DESCRIPTION OF THE PREFERRED EMBODIMENT

Figure 2A:
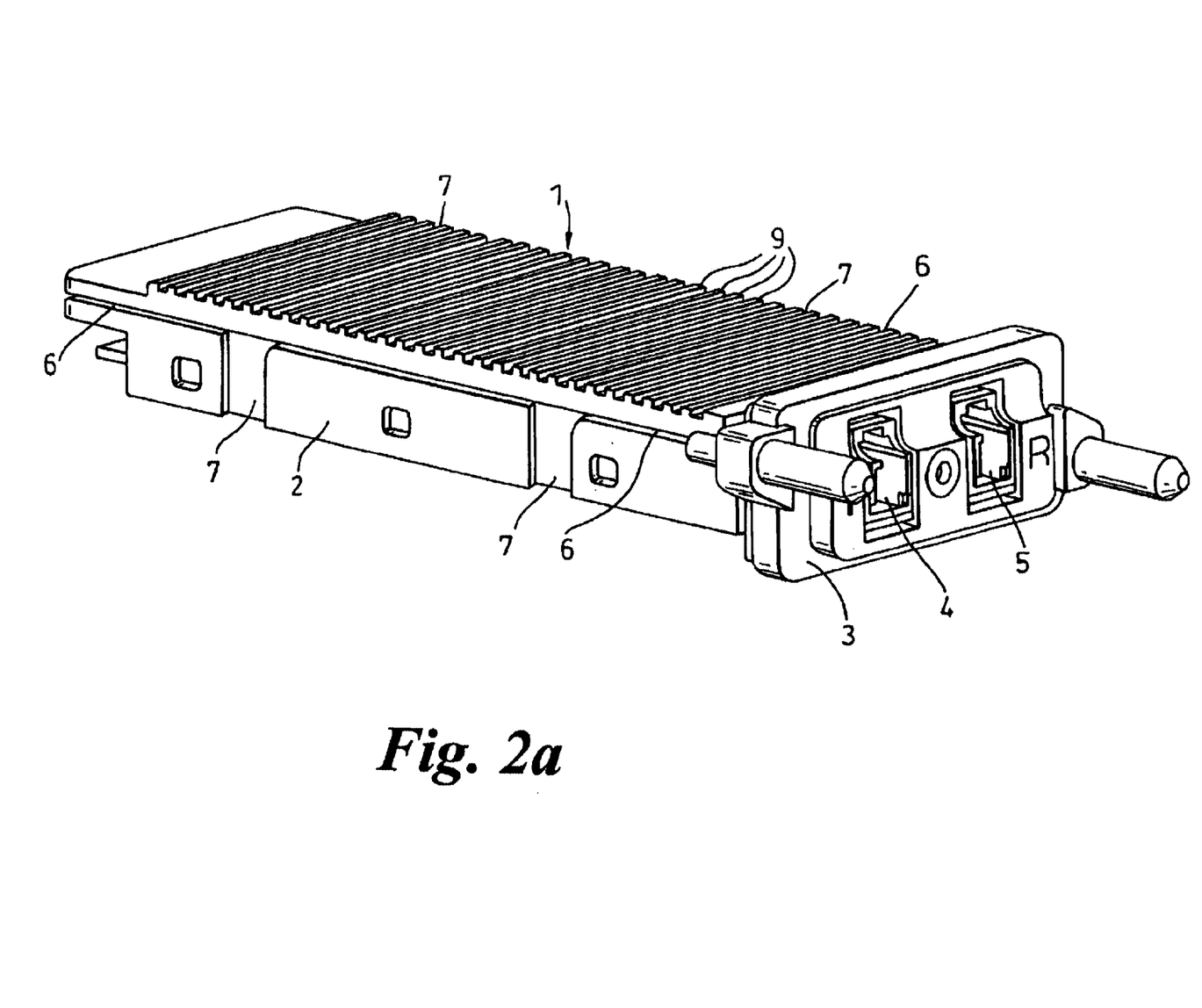
FIG. 2a shows an elevated view of the module.
Figure 2B:
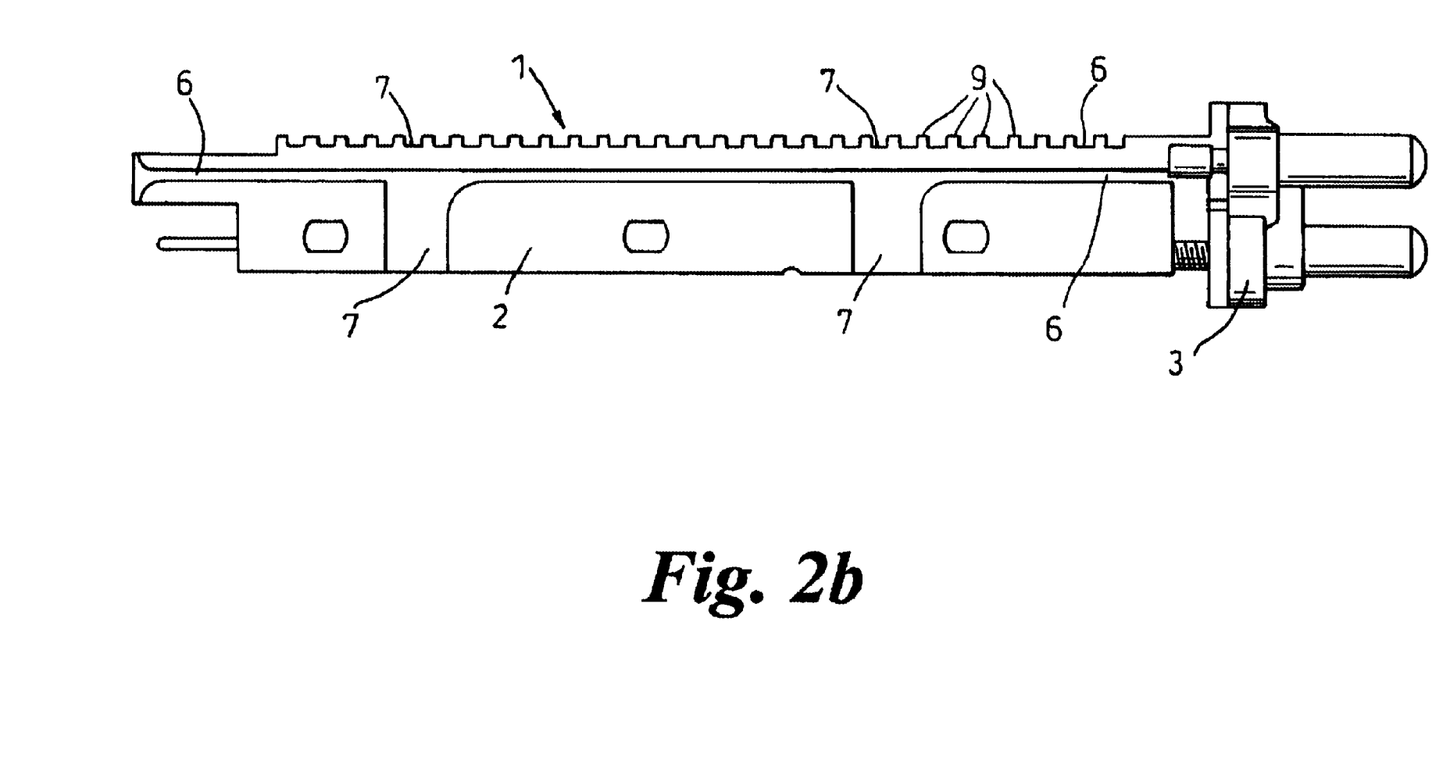

In FIGS. 2a and 2b, the electro-optical module 1 according to the present invention is shown comprising housing 2, bezel 3, apertures 4 and 5. The housing and bezel are preferably made of metal. However, other suitable material, such as a suitably loaded or coated polymer could be used.

The housing is configured with a series of fins 9, which are arranged in rows and act as heat sinks. The apertures 4 and 5 provide access to the internal components of the module. In this embodiment aperture 4 provides access to an optical signal transmitter (not shown) and aperture 5 provides access to an optical signal receiver (not shown). Alternatively, aperture 4 can provide access to the receiver and aperture 5 can provide access to the transmitter.

In the preferred embodiment shown in FIGS. 2a and 2b, apertures 4, 5 are of the type suitable for receiving optical fibres fitted with LC type connectors. However, other connector types, such as SC, could be used.

Disposed along the side of the module is horizontal groove 6 and vertical slot 7. In this embodiment of the invention the module has two horizontal grooves disposed on opposite sides of the module. This module also has two sets of vertical slots also disposed on opposite sides of the module. The groove and slots located on the far side of the module are not visible in FIGS. 2a or 2b, however their presence and approximate location are indicated in the figures according.

In alternative embodiments (not shown) covered by the scope of the present invention, only a single horizontal groove is located on the module with no vertical slots. Alternatively, a single horizontal groove with a single vertical slot can be disposed on the same side of the module or on both sides of the module.

Figure 3A:
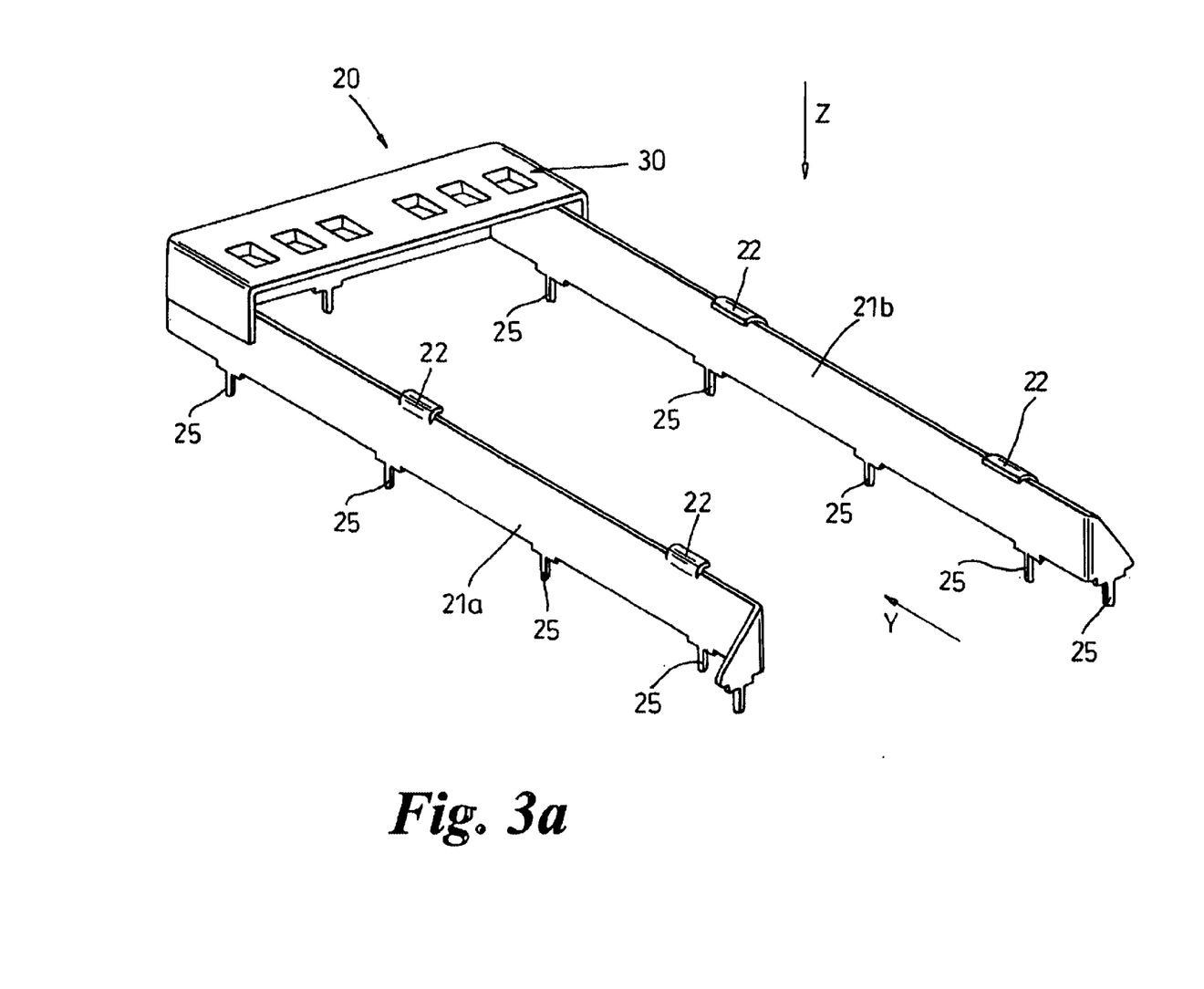
FIG. 3a shows an elevated view of the module mounting means.

In FIG. 3a the module mounting means 20 is shown comprising two rails 21a and 21b disposed parallel to each other and connected at one end by shielding means 30. Along the top edges of the rails are disposed a plurality of protrusions 22. The protrusions function to receive the module first via the vertical slots in the Z direction, and then via the horizontal grooves in the Y direction. This results in a drop and slot type arrangement for inserting the module into the module mounting means, in which the slots, grooves and protrusion arrangement act as a guide for the module. As will be appreciated, the location and number of protrusions can vary within the scope of the present invention. For example, the protrusions may be located in the middle of the rails or towards the top of the rail as shown in FIGS. 3a and 3b.

Figure 3B:
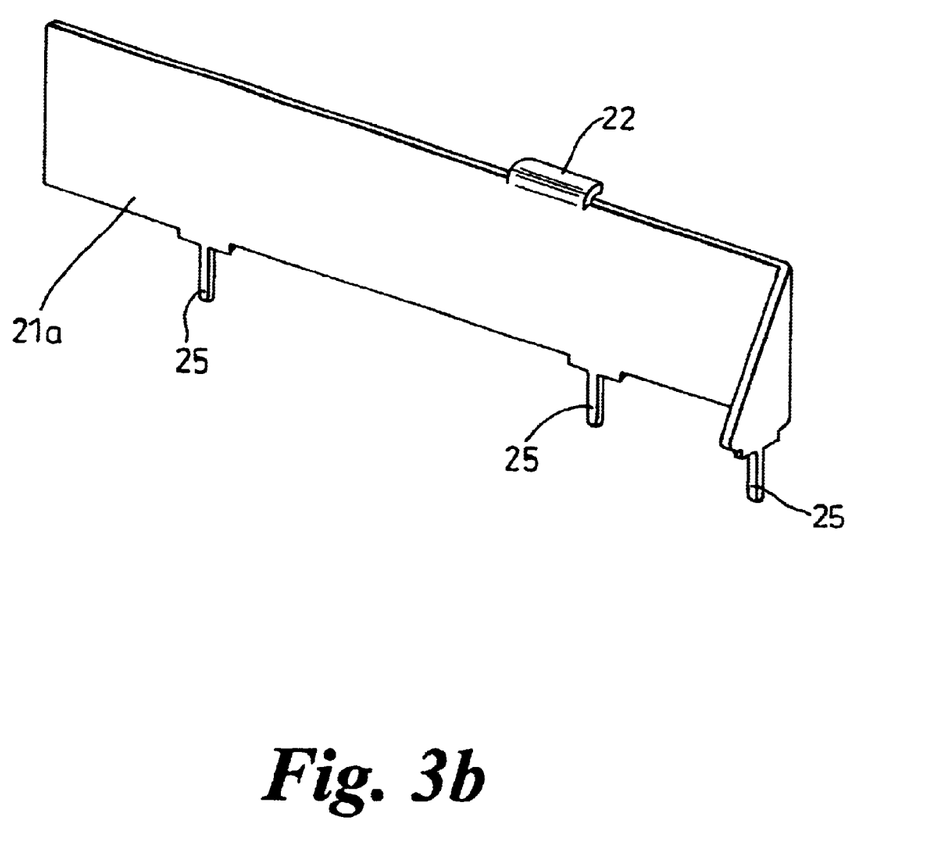
FIG. 3b shows a detailed view of one rail of the module mounting means shown in FIG. 3a, FIG. 4a shows an elevated view of the module of FIG. 2a inserted in the module mounting means of FIG. 3a, FIG. 4b shows a side view of module and module mounting means shown in FIG. 4a, FIG. 5 shows an elevated view of the module inserted in the module mounting means with the mounting means attached to a PCB.

In FIG. 3b the dimensions of the rail 21a and the protrusions 22 for this preferred embodiment of the invention are given in millimetres. As will be appreciated the protrusion must be sized so as to fit into the slots and grooves of the module.

Figure 5:
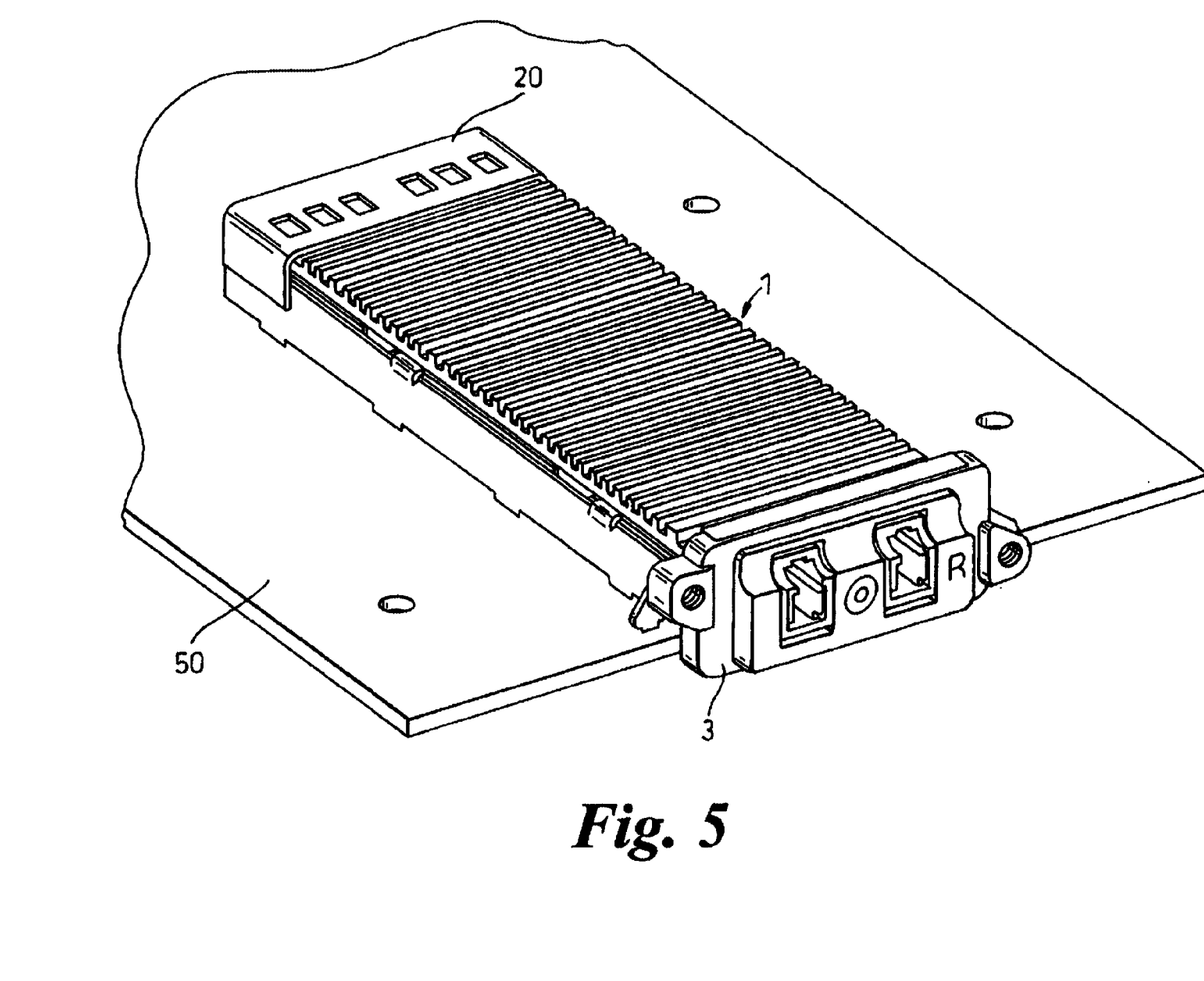

Also seen in FIGS. 3b and 3a are a plurality of posts 25 disposed on the mounting means 20. As will be appreciated, the number and location of these posts may vary. As can be seen in FIG. 5, these posts function to facilitate the fixing of the mounting means 20 to a PCB 50 or other suitable base plate. The PCB or base plate is preferably part of a fibre optic telecommunications\networking system.

Figure 4A:
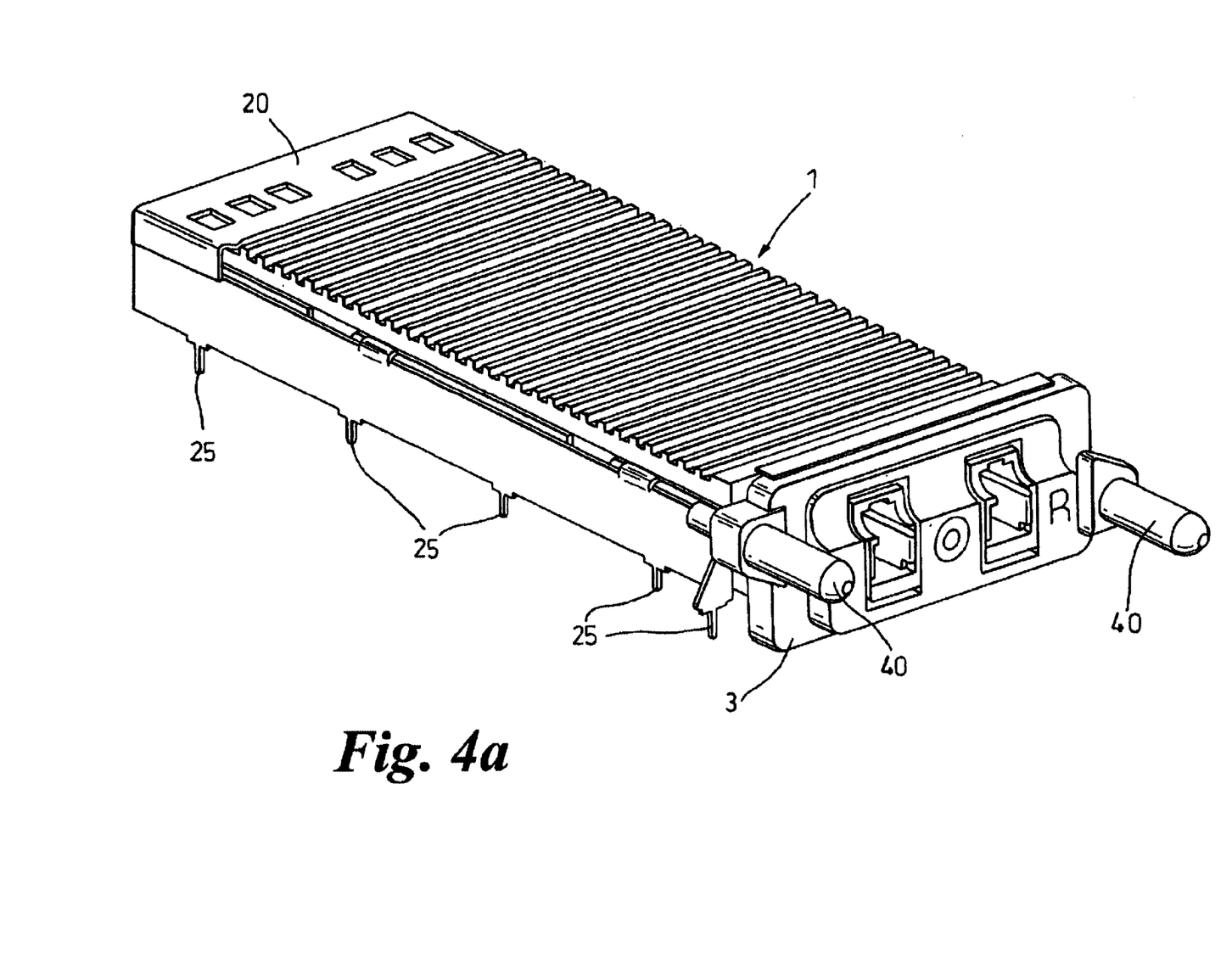
Figure 4B:
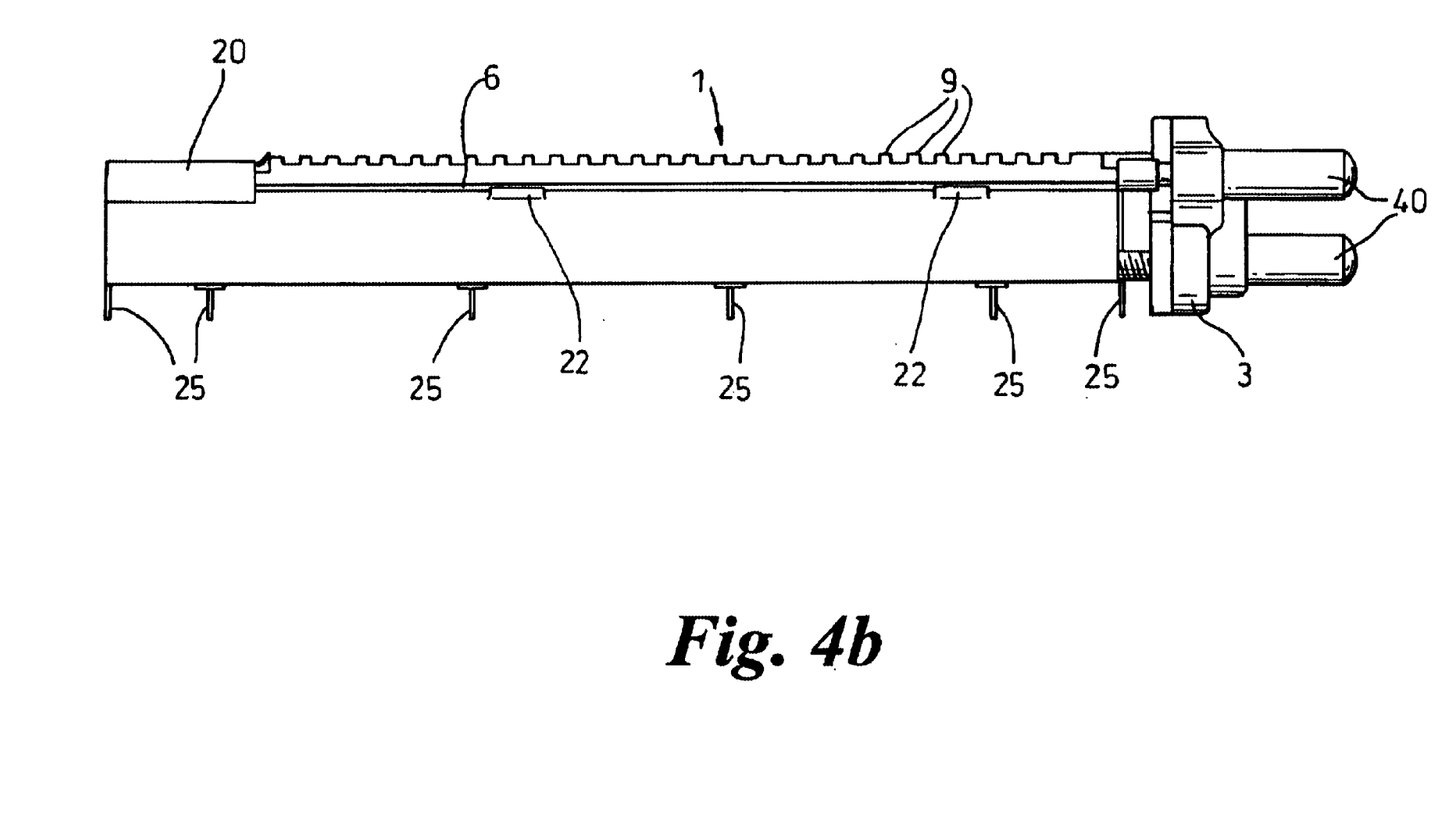

Now as seen in FIGS. 4a and 4b, the module 1 is inserted into the mounting means 20 and is held securely in place by fixing means 40. The fixing means are preferably a pair of thumbscrews, which are screwed into the module mounting means or into the customer's hardware.

Advantageously this arrangement uses a minimum of space on the customer's PCB or baseplate. Furthermore, the grooves and protrusion arrangement may act to support the module once it is inserted into the assembly. As will be appreciated, the location for the protrusions and corresponding horizontal grooves will determine the height in which the module is located within the mounting means.

Figure 6:
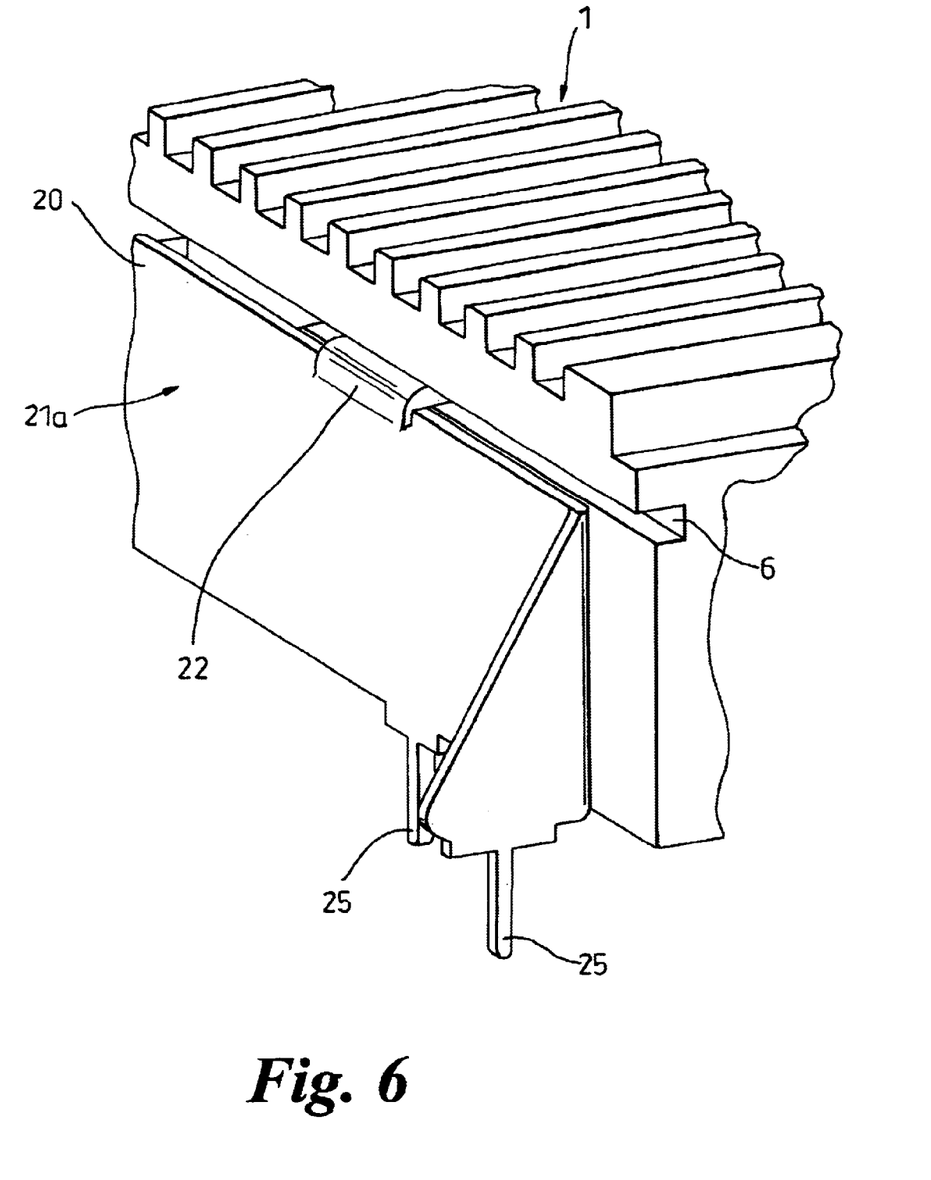
FIG. 6 shows a more detailed view of the interaction of the module's grooves and the module mounting means' protrusions.

FIG. 6 shows a more detailed view of the protrusions 22 inserted in the horizontal groove 6. In this embodiment the protrusions are approximately 0.5 mm thick and extend 1.3 mm inwardly toward the module. The module's horizontal groove 6 is approximately 1.0 mm high, 1.5 mm deep and extends along the entire length of the module. The vertical slots 7, more clearly seen in FIGS. 2a and 2b, are approximately 6.0 mm wide, 8.5 mm deep and extend from the bottom of the module until the vertical slot intersects the horizontal groove.

As will be appreciated, other dimensions of grooves, slots and protrusions may be used without departing from the scope of the present invention.

Figure 7:
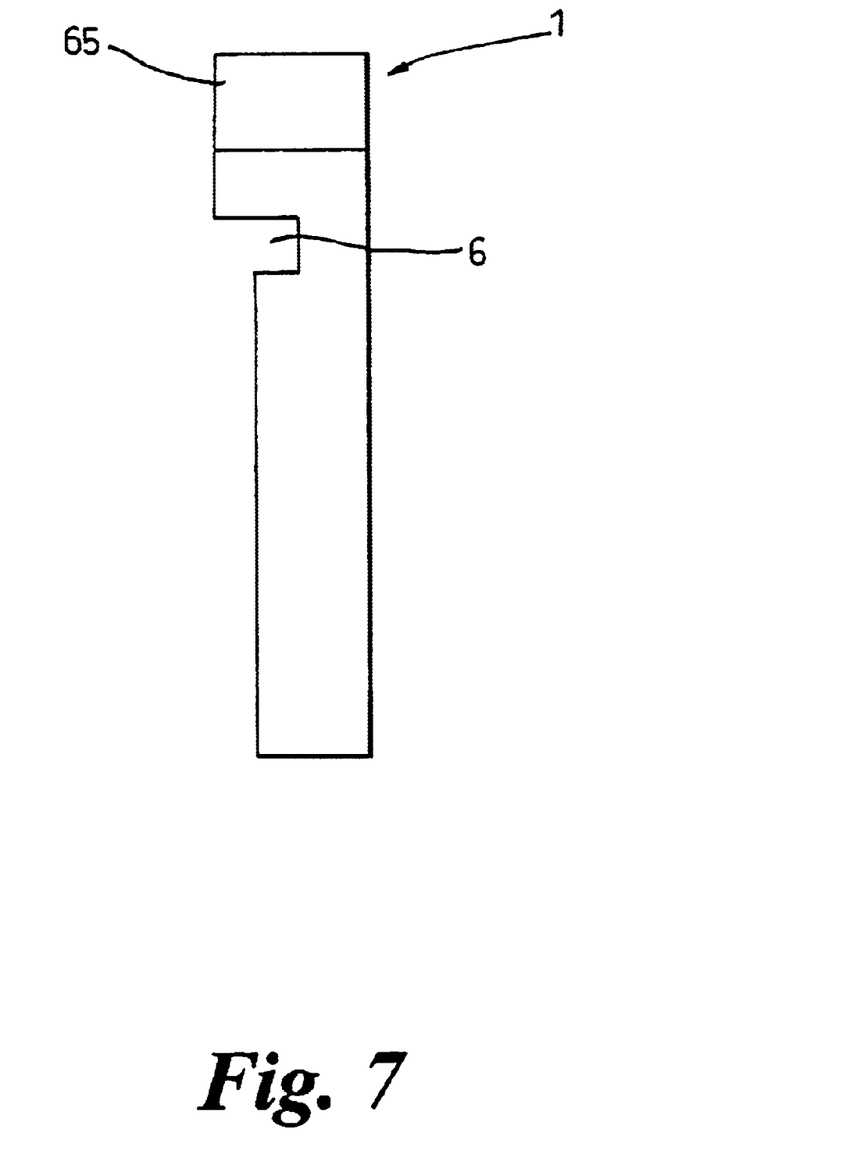
FIG. 7 shows a an alternative embodiment of the module's horizontal grooves.

In alternative embodiment of the horizontal groove shown in FIG. 7, the module includes a ridge 65 extending outwardly from the module immediately above the horizontal groove 6. Advantageously, this ridge facilitates the insertion of the module into the mounting means and helps to retain the module within the mounting means.

It is known in the field of optical communication that good electrical ground connections are essential for optimum system performance. Establishing and maintaining good electrical ground connection is another key aspect of the present invention.

Figure 8:
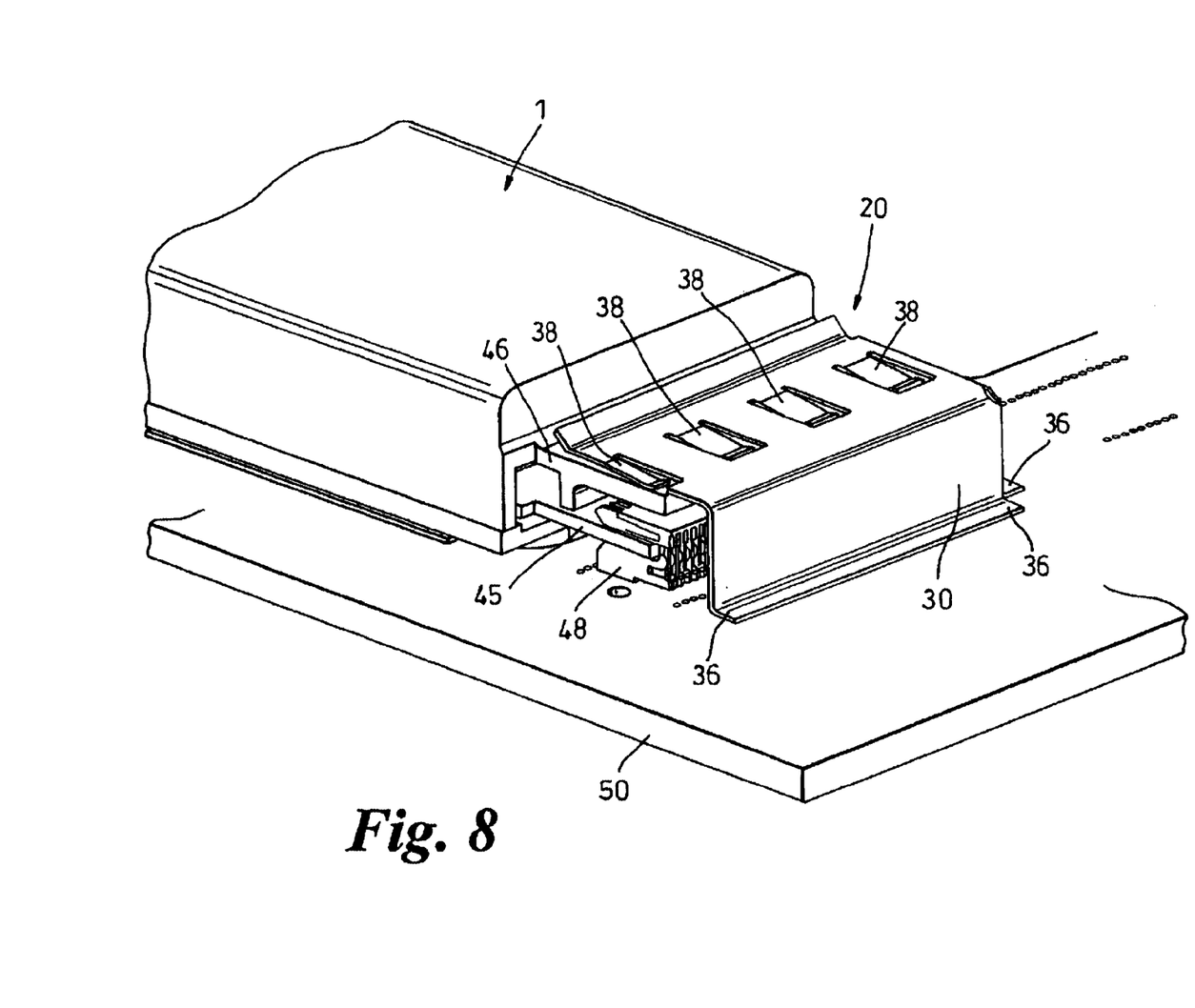
FIG. 8 shows a detailed view of the electrical connection end of the module and module mounting means.

As seen in FIG. 8 and disposed at the rear end of the module opposite to apertures 4 and 5 is module electrical connector means 45, which is inserted into electrical connector receiving means 48 disposed on the PCB. This establishes electrical connection between module 1 and PCB 50. The connector means 45 and receiving means 48 are preferably multiway edge connectors. Electrical connection means 45 may further function to provide mechanical support for the module once inserted.

The shielding means 30 is electrically connected to the PCB 50 along the lower edge 36 of the shielding means. The shield means is made of metal and arranged to reduce the amount of electromagnetic radiation being emitted from the area of electrical connection, thus providing EMI shielding. The shield means may include a plurality of resilient fingers 38 which exert pressure on rear extending portion 46 of module 1 when the module is fully inserted into module mounting means 20. These resilient fingers function to ensure good electrical connection between the shield means and the module.

In FIG. 8 a portion of shield means 30 has been removed to better show connectors 45 and 48. As will be appreciated with multiway edge connectors, the height of connector means 45 must be precisely aligned to connector receiving means 48 in order for connection to be made. The accurate location of the horizontal grooves and protrusions enable the precise alignment of connector 45 with connector receiving means 48.

Advantageously, a module according to the present invention can be easily inserted and removed from the mounting means. Furthermore, using an assembly according to the present invention allows for additional modules or replacement modules to be easily inserted, thus providing a totally pluggable system.

The electro-optical module assembly described above is preferably configured to operate in a 2.7 Gbit serial optical DWDM system. To this effect the module is configured as an optical transceiver operating at wavelengths ranging from 1525 nm to 1610 nm with sufficient power to operate over a 100 kilometre single mode optical fibre link. However, the module assembly concept of the present invention is equally applicable for use at other speeds and at different wavelengths, as well as over different distances and with different types of fibres.

Furthermore, the electro-optic assembly, according to the present invention is suitable for both pluggable and fixed-type customer configurations.

Furthermore, the electro-optic assembly, according to the present invention, can be used in both front panel mounted pluggable configurations as well as top mounted pluggable configurations.

What is claimed is:

1. An electro-optical assembly comprising an electro-optical module and a module mounting means, said electro-optical module having a horizontal groove and a slot disposed perpendicular to said horizontal groove, and said module mounting means having a protrusion arranged to receive said horizontal groove and said slot.

2. An assembly as claimed in claim 1, wherein said electro-optical module comprises two grooves disposed on opposite sides of said electro-optical module.

3. An assembly as claimed in claim 2, wherein said electro-optical module comprises a plurality of slots disposed on opposite sides of said electro-optical module.

4. An assembly as claimed in claim 1, wherein said module mounting means comprises a plurality of protrusions disposed on opposite sides of said module mounting means.

5. An assembly as claimed in claim 1, wherein said module mounting means is disposed on a printed circuit board.

6. An assembly as claimed in claim 5, wherein said module mounting means further comprises at least one post extending from said module mounting means to facilitate connection of said module mounting means to said printed circuit board.

7. An assembly as claimed in claim 1, wherein said module mounting means further comprises EMI shielding means.

8. An assembly as claimed in claim 7, where n said EMI shielding means includes at least one resilient finger arranged to exert pressure on said electro-optical module so as to improve electrical connection between said electro-optical module and said EMI shielding means.

9. An assembly as claimed in claim 1, wherein said electro-optical module is a transmitter.

10. An assembly as claimed in claim 1, wherein said electro-optic module is a receiver.

11. An assembly as claimed in claim 1, wherein said electro-optic module is a transceiver.

12. An electro-optical module comprising:

a housing;

at least one electro-optical component internal to said housing;

a first groove in a first side of said housing; and a first slot in said first side, said first slot being configured to receive a mounting member in a first direction before said first groove receives the mounting member in a second direction during mounting of the electro-optical module to the mounting member.

13. The electro-optical module as claimed in claim 12, further comprising a series of heat sink fins arranged on said housing.

14. The electro-optical module as claimed in claim 12, further comprising at least one aperture providing access to said internal component.

15. The electro-optical module as claimed in claim 14, wherein said at least one aperture is an LC type connector or an SC type connector.

16. The electro-optical module as claimed in claim 12, wherein said housing is formed of metal or a coated polymer.

17. The electro-optical module as claimed in claim 12, further comprising a second groove and a second slot in a second side of said housing, said second slot being configured to receive the mounting member in said first direction before said second groove receives the mounting member in said second direction during mounting of the electro-optical module to the mounting member.

18. The electro-optical module as claimed in claim 12, wherein said at least one electro-optical component is a component selected from the group consisting of a receiver, a transmitter, and any combinations thereof.

19. The electro-optical module as claimed in claim 12, wherein said first slot is perpendicular to said first groove.

20. The electro-optical module as claimed in claim 12, further comprising a second slot in said first side, said second slot being spaced from said first slot along said first groove, wherein said first and second slots are configured to receive the mounting member in said first direction before said first groove receives the mounting member in said second direction during mounting of the electro-optical module to the mounting member.

* * * * *